United States Patent [19]

Killebrew et al.

[11] Patent Number: 5,577,244

[45] Date of Patent: Nov. 19, 1996

[54] METHODS OF APPLYING SOFTWARE MODIFICATIONS

[75] Inventors: Alice J. Killebrew, Buchanan Dam; Charles F. Mann, Austin, both of Tex.

[73] Assignee: International Business Machines Corporation, Armonk, N.Y.

[21] Appl. No.: 471,044

[22] Filed: Jan. 26, 1990

Related U.S. Application Data

[63] Continuation of Ser. No. 75,794, Jul. 20, 1987, abandoned.

[51] Int. Cl.⁶ .................................................. G06F 15/177
[52] U.S. Cl. ..................... 395/703; 395/619; 364/DIG. 1; 364/280.2; 364/286
[58] Field of Search ..................................... 364/200, 900; 395/600, 700

[56] References Cited

U.S. PATENT DOCUMENTS

| | | | |
|---|---|---|---|
| 4,477,880 | 10/1984 | Advani et al. | 364/900 |
| 4,498,142 | 2/1985 | Advani et al. | 364/900 |
| 4,556,954 | 12/1985 | Advani et al. | 364/900 |
| 4,558,413 | 10/1985 | Schmidt | 364/300 |
| 4,734,854 | 3/1988 | Afshar | 364/300 |
| 4,747,127 | 3/1988 | Hansen et al. | 364/200 |
| 4,763,271 | 8/1988 | Field | 364/900 |
| 4,809,170 | 2/1989 | Leblang et al. | 364/200 |

OTHER PUBLICATIONS

Feldman, Stuart, "Make–A Program for Maintaining Computer Programs", Software Practice and Experience, vol. 9, No. 4, pp. 255–256, Apr. 1979.
Cristofor, E. et al, "Source Control+Tools=Stable Systems", Proceeding of the 4th Comp. Software and Appl. Conf., pp. 527–532, Oct. 29–31, 1980.
Tichy, W. F., "Design Implem. and Eval. of a Revision Ctrl Syst", Proc. of the 6th Int'al Conf. on Software Engineering, Tokyo, Japan, Sep. 1982.
IBM Technical Disclosure Bulletin, vol. 29, No. 11, Apr. 1987, pp. 5059–5060 "Method to control software–update applications".
IBM Technical Disclosure Bulletin, vol. 29, No. 8, Jan. 1987, p. 3691, Armonk, NY, US; "Automatic Application of Installation data".
IBM Technical Disclosure Bulletin, vol. 28, No. 4, Sep. 1985, p. 1487, Armonk, NY, US; "Device/profile installation procedure with validation".
IBM Technical Disclosure Bulletin, vol. 25, No. 10, Mar. 1983, p. 5148, Armond, NY, US; H. G. Advani, et al; "Diskette compatibility verification during program combine tasks".

*Primary Examiner*—Thomas G. Black
*Assistant Examiner*—John Loomis
*Attorney, Agent, or Firm*—H. St. Julian; Casimer K. Salys

[57] ABSTRACT

A software program having a plurality of separately installable features installed on a computer system is to be updated. An end user invokes an update program to update the installed software program. The user selects one of a plurality of operating modes for the computer system and identifies a target drive and directory where the software program is stored. Thereafter, the user identifies a source drive and directory where a plurality of update files are stored. If a prompted mode of operation has been selected, the system copies the update files from the source drive and directory to the target drive and directory and then applies all of the updates to the respective features stored on the target drive in a sequential manner. If a full function mode of operation has been selected, the system copies the update files from the source drive and directory to the target drive and directory and then displays the highest numbered update stored on the target drive and directory for a selected installed feature. The user can apply the highest numbered update and all of the lower numbered updates associated with the selected feature or a subset of the updates in a sequential manner.

6 Claims, 6 Drawing Sheets

```
Mode Selection for Update
Use this menu to choose the operating mode.

The Prompted Mode is for the first time user. It
provides a method for applying the update files with a
minimum number of decisions.

The Full Function Mode is for the experienced user. It
provides a menu driven method for updating the
software program. The user must choose the
different functions of the update and the order of
execution.

Select a mode and press Enter.

>   1.   Prompted mode
X   2.   Full function mode

─────────────────────────────────────────────
Esc = Cancel     F1 = Help
```

FIG. 3

```
Target Drive and Directory for Update

You can update your system on the drive and directory
that is displayed below, or you can enter a different
target drive and directory.

Press Enter to use the drive and directory that are
displayed, or type a new drive and directory and
press Enter.

Target drive and directory. . [C:\ACS             >

Enter    Esc=Cancel    F1=Help
```

FIG. 4

```
Copy Update Files

Update files must be copied to your target directory
before the updating of your system can be completed.

The copy update files selection will prompt you for the
location of the update files, copy them to the target
directory, and install the updates on your system.

Select an item and press Enter.
> 1.   Copy the update files
X 2.   Complete the installation Esc=Cancel    F1=Help
```

FIG. 5

```
Source Drive and Directory of the Update Files

The update program uses the following source drive
and directory for copying update files unless you type
a different drive and directory.

Press Enter to use the drive and directory that are
displayed, or type a new drive and directory and
press Enter.

Source drive and directory. . [A:\              >

Enter    Esc=Cancel    F1=Help
```

FIG. 6

```
              Full Function Selection Menu

Use this menu to apply updates, and selectively
install or remove other features.

Select an item and press Enter.

> 1.    Install features
X 2.    Remove features
X 3.    Apply updates to the installed system
X 4.    Complete the installation Esc=Cancel    F1=Help
```

FIG. 7

Apply Updates

Use this menu to apply program updates to the installed system. You may be instructed to use a lower update number than one listed below. To change the update numbers, cursor to the field, type the new number, and press Enter when all are correct. If they are already correct, press Enter.

| Update Number | System Components |
|---|---|
| [xxx] | System Base Code |
| [xxx] | Group 1 Features |
| |    3270 Terminal Emulation |
| |    Server-Requester Programming Interface |
| |    Advanced Program to Program Communication |
| [xxx] | Group 2 Features |
| |    ASCII Terminal Emulation |
| |    ASDI |
| [xxx] | Help Panels |
| [xxx] | Installation Program |

Enter     Esc=Cancel     F1 = Help

METHODS OF APPLYING SOFTWARE MODIFICATIONS

This is continuation of application Ser. No. 07/075,794 filed Jul. 20, 1987 now abandoned.

TECHNICAL FIELD

This invention relates generally to updating software, and more particularly to methods of correcting and updating code installed in a computer system in an accurate and user friendly manner.

BACKGROUND INFORMATION

With the introduction of the personal computer, the generation of software programs has become a rapidly growing field. Additionally, the number of users of the personal computer has continued to increase. The increase in the number of users of personal computers has this basis in an increase in computing power in the reduction in cost of such systems. Along with the increase with the number of users of these systems has been an increase in the number of less sophisticated users of such systems. Software programs are becoming complex to compensate for the skills of these less sophisticated users and in view of the competitive nature of the software business, software developers are encountering greater difficulty in thoroughly testing and correcting the software programs prior to the release thereof to the marketplace.

One known technique for providing updates to software programs installed on main frame computers requires the updates to be applied by a vendor's field representative or by a customer's highly trained computer professional. These updates are not user friendly and typically, cannot be applied by an ordinary end user. This technique for updating software programs installed on a computer system becomes very complicated when the installed program is an operating system or a communication software program having a plurality of features of which a combination of these features are installed on the computer system. This problem becomes more complex when the communication software program having a number of features is installed on a plurality of personal computers and a different combination of features is installed on the various personal computers.

Consequently, a user friendly technique is needed which facilitates the updating of software programs having a plurality of features installed in various combinations on a plurality of computers.

DISCLOSURE OF THE INVENTION

A method of correcting a software program having a plurality of features wherein a combination of the features are installed on a computer system. An end user selects one of a plurality of operating modes for the system. A plurality of update files are then read into a memory system of the computer system. The system then determines which of the plurality of features are installed thereon. Thereafter, selected update files are applied to the software program according to the features of the software program installed on the computer system.

BEST MODE FOR CARRYING OUT THE INVENTION

Figure 1:
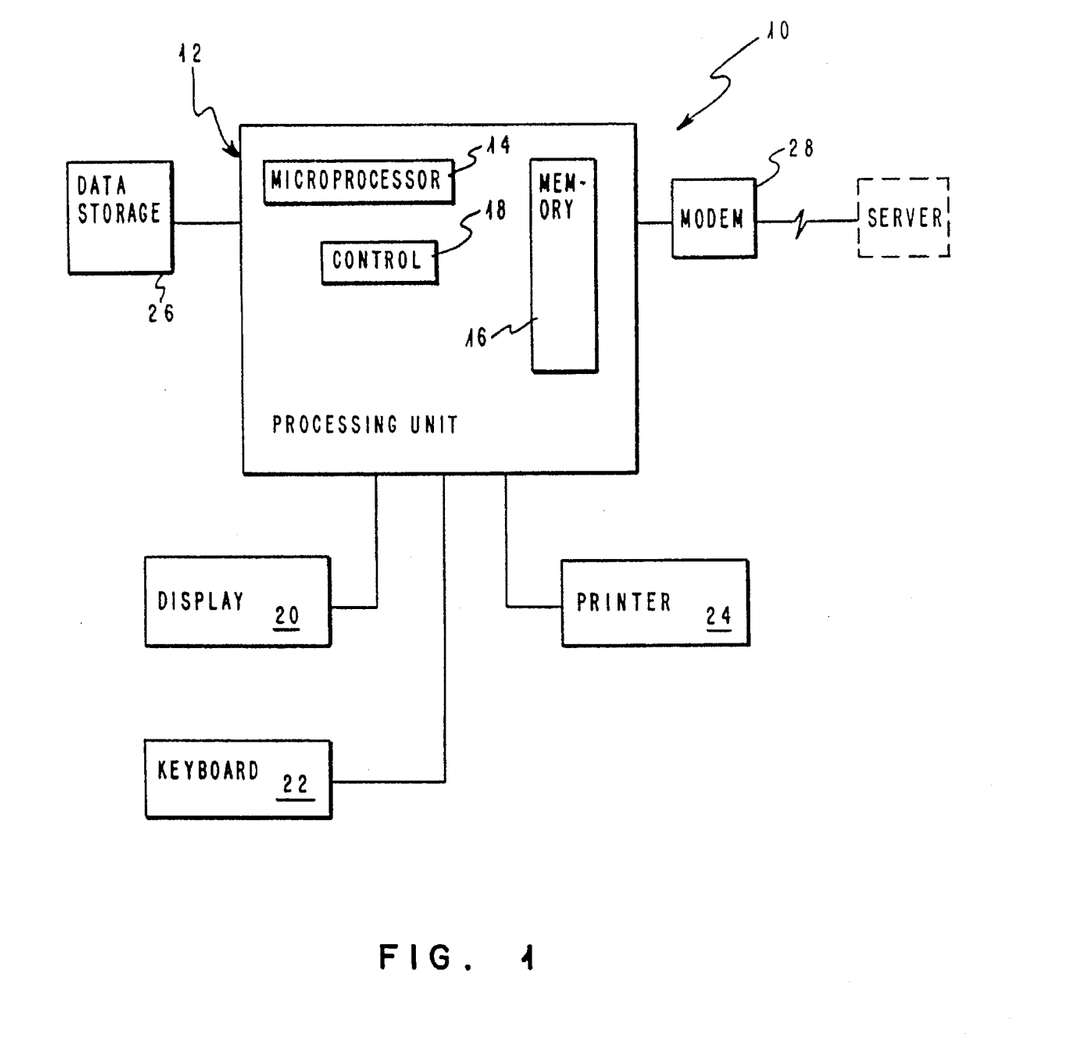
FIG. 1 is a block diagram of a computer system on which the method of the present invention may be employed.

Referring to FIG. 1, there is shown a computer system 10 on which the present invention may be employed. System 10 includes a central processing unit 12 having a microprocessor 14, a memory system 16 and a control system 18 which functions to control input/output operations in addition to the interaction between the microprocessor and the memory system. System 10 also includes a group of conventional peripheral units including a display device 20, a keyboard 22, a printer 24, a data storage unit 26 and a modem 28. Since the details of the above described functional systems form no part of the present invention and can be found in the prior art, only a brief functional description of each of the systems will be set forth.

The central processing unit 12 corresponds to the "system unit" of a personal computer system such as the IBM XT or the IBM AT or the IBM Personal Systems/2 computer systems. The central processing unit 12 is provided with a multitasking operating system program such as the IBM Operating System/2 which is normally employed to run the systems. The operating system program is stored in memory system 16 along with one or more application programs that the user has selected to run. Depending on the capacity of the memory system 16 and the size of the application programs, portions of these programs, as needed, may be transferred to the memory system 16 from the data storage unit 26 which may include, for example, a hard disk drive and a diskette drive. The basic function of the data storage unit 26 is to store programs and data which are employed by the system 10 and which may readily be transferred to the memory system 16 when needed. The function of the diskette drive is to provide a removable storage function for entering programs and data into the system, and a vehicle for storing data in a form that is readily transportable for use on other computer systems.

Display device 20 and keyboard 22 together provide for an interactive operation of the computer system 10 wherein the interpretation that the computer system gives to a specific keystroke by the user depends, in substantially all situations, on what is being displayed to the user at that point in time.

In certain situations, the user, by entering commands into the computer system 10, causes the system to perform a certain function. In other situations, the computer system 10 requests the entry of certain data, generally by displaying a prompt type of menu/message screen. The depth of the interaction between the user and the computer system 10 varies by the type of operating system and the application program, but is a necessary characteristic of the computer systems on which the method of the present invention may be employed.

As noted above, computer system 10 includes the printer 24 which functions to provide a hard copy output of data developed or stored in the computer system. The modem 28 functions to transfer data from the computer system 10 to a remote host system or server system through one or more communication links which may be a commercial type link or a dedicated communications link.

System 10 includes an update program stored in the memory system 16 thereof which enables the system to operate in two selectable modes for updating a software program installed thereon. A prompted mode, which is intended for use by less sophisticated users, provides a method of updating the installed software program with a minimum number of decisions. A full function mode, which is intended to be used by sophisticated users, provides a menu driven method enabling the user to select (1) different functions of the update program and (2) the order of execution of the selected functions.

Set out below is an illustration of the update program for applying software modifications or updates to the software program having a plurality of separately installable features or components installed on system 10. The update program is in program design language from which source code and machine code are derivable. In the following general description of the update program, it is to be assumed that system 10 is under mouse and keyboard device control. Moreover, it is assumed that the update program is invoked from a driver program contained in the operating system which facilitates the display of all of the screen panels, the monitoring of the keyboard 22 and the installation of the plurality of separately installable features or components of the software program. Since the interface to the driver program is not essential to the invention, it will not be described in detail. However, it should be noted that whatever software program invokes the update program is assumed to pass thereto the inputs of an OPERATION_ CODE parameter and a VISIBLE_PNL parameter. The update program returns an OS_ERROR_CODE parameter and a RETURN_CODE parameter to the driver program.

The OPERATION_CODE parameter contains the value of PROCESS or INITIALIZE. The value INITIALIZE indicates that the driver program has invoked the update program for the first time during a current session. If the user has selected the prompted mode, the update program then applies all unapplied updates to all of the installed features or components prior to returning control to the operating system. If the user has selected the full function mode, the update program prepares a screen panel which displays a list of all of the features or components of the software program installed on system 10 and respective value of the highest sequential update that can be applied to each of the features. Thereafter, when the update program returns control to the driver program, the driver program displays to the user on the display 20 the prepared screen panel. The user is then permitted to lower any of the update values associated with any of the displayed features. When the update program is invoked a second time in the full function mode, the OPERATION_CODE parameter contains the value of PROCESS. The value PROCESS indicates that the user has had an opportunity to lower the update values for the features and the updates are to be applied to the installed software program.

The VISIBLE_PNL input parameter indicates which screen panel is currently being displayed to the user. The update program uses this information to determine whether the screen panel of components and update numbers it prepared is the one being shown.

The OS_ERROR_CODE parameter indicates the largest error code value it has received from any of the operations performed by the operating system. These operations include such functions as opening, reading, and closing files. In the update program, a successful operation is seen to receive the value of GOOD from the operating system. The update program will terminate prematurely if any other value is received from the operating system.

The RETURN_CODE parameter returns a value to the driver program by the update program indicating the actions it has taken and operations it expects the driver program to complete. The RETURN_CODE parameter contains the value of DISPLAY, BACKUP, or FINISH. DISPLAY indicates that the screen panel of components and update limits has been prepared and is ready to be displayed to the user. BACKUP indicates that the user has selected to view a panel which was displayed prior to the display of the screen panel of components and update limits. The driver program thereafter displays the previously displayed screen panel. FINISH indicates that the work of the update program has been completed. All of the selected updates have been applied or the operating system has encountered an error.

In the prompted mode, the update program is invoked with the INITIALIZE value in the OPERATION_CODE parameter. The update program then applies all the possible updates and returns with the FINISH value in the RETURN_CODE parameter. In the full function mode, the update program is invoked the first time with the INITIALIZE value in the OPERATION_CODE parameter. The screen panel is prepared with the upper limits of the updates, and the update program returns with the DISPLAY value in the RETURN_CODE parameter. The update program is then invoked the second time in the full function mode with the OPERATION_CODE parameter containing the PROCESS value. The updates are applied to the various installed components based upon the user's selections from the displayed screen panel. The update program then returns with the FINISH value in the RETURN_CODE parameter.

The update program is comprised of nine internal subroutines and one external subroutine (NAME_LISTER). The program design language assumes a programming language that defines all variables in the main routine in a way that all of the internal subroutines have access to them. Therefore, it is unnecessary to explicitly pass these variables as parameters to any of the internal subroutines when they are called. However, any external subroutine which does not have direct access to these variables will have to pass the variables back and forth in a parameter list.

```
MAIN PROC
    INITIALIZE OS_ERROR_CODE TO ZERO.
    IF OPERATION_CODE IS INITIALIZE, THEN
        CALL PANEL_PREP TO SEARCH THE UPDATE
                DIRECTORY FILE TO GET FIX
                LIMITS AND PUT THEM IN THE
                PANEL PARAMETERS.
        IF NO ERRORS FROM PANEL_PREP, THEN
            IF MODE IS FULL FUNCTION, THEN
                RETURN_CODE = DISPLAY
            ENDIF
        ENDIF
    ENDIF
    IF NO ERRORS FROM PANEL_PREP, THEN
        IF OPERATION_CODE IS PROCESS OR MODE
                IS PROMPTED, THEN
            IF VISIBLE_PNL IS APPLY UPDATES AND
                    USER PRESSED ESC KEY, THEN
                OS_ERROR_CODE = ZERO
                RETURN_CODE = BACKUP
            ELSE USER IS NOT BACKING OUT OF
                PROGRAM IF MODE IS FULL
                FUNCTION, THEN
                CALL COMPATIBLE TO DETERMINE
                    THE COMPATIBLE FIX
                    LIMITS.
                CALL UNFIX TO REMOVE ALL
                    UPDATES FROM CODE
                    GROUPINGS THAT ARE
                    ALREADY APPLIED ABOVE
```

```
              THE FIX LIMITS.
          ENDIF
          IF NO OS ERRORS, THEN
              CALL APPLY_FIXES TO APPLY
                  THE FIXES UP TO THE
                  LIMITS.
              RETURN_CODE = FINISH
          ENDIF
        ENDIF
      ENDIF
    ENDIF
ENDPROC MAIN PROC
PANEL_PREP PROC
    OPEN THE UPDATE DIRECTORY FILE
    DO WHILE NOT END OF FILE AND NOT AN ERROR
        READ A RECORD FROM UPDATE DIRECTORY
            FILE GETTING THE GROUP_ID
            AND ITS UPDATE NUMBER.
        FIX LIMIT FOR CODE GROUPING IN
            RECORD = UPDATE NUMBER
            FROM RECORD
    ENDDO
    CLOSE UPDATE DIRECTORY FILE.
    IF ERROR FROM CLOSING FILE IS GREATER THAN
        THE OS_ERROR CODE THEN
        OS_ERROR_CODE = CLOSING FILE
            ERROR VALUE
    ENDIF
ENDPROC PANEL_PREP
```

Each of the subroutines will be discussed in detail. The first subroutine, PANEL_PREP, opens an update directory file which contains information on all the updates available. Information on each update is contained in records in the file. The directory file has its records sorted in ascending order by feature or code grouping ID, update number, and sequence number. PANEL_PREP reads each record placing the update number from the record into a FIX LIMIT variable for the corresponding code grouping. After every record has been read, the FIX LIMIT variables will contain the largest update number available for each of the code groupings. The screen panel, which is displayed to the user, shows the contents of the FIX LIMIT variables adjacent to the name of the code grouping. The update directory file is then closed and the largest error value returned from the operating system is returned to the main routine, MAIN, in the OS_ERROR_CODE variable.

If the update program was invoked in the full function mode, then the RETURN_CODE is set to DISPLAY and control is then returned to the driver program so that the prepared screen panel can be displayed to the user. The screen panel gives the user the opportunity to lower the FIX LIMIT variables displayed thereon. The driver program then recalls the update program with the PROCESS value in the OPERATION_CODE parameter so that the second half of the main program can be executed to apply the updates.

A test is made after the update program is invoked in order to determine if the user pressed an escape key or corresponding selection from a mouse device. This action indicates that the user wishes to return to the previous operation the driver program was engaged prior to the update program being invoked. If the user has pressed the escape key or its equivalent with the aid of the mouse or some other input device, the update program returns the BACKUP value in the RETURN_CODE parameter to the driver program. Otherwise, the preparation of the screen panel continues by calling the subroutine COMPATIBLE to adjust the FIX LIMIT variables for each of the code groupings so that they are compatible with each other and by calling subroutine UNFIX to delete software components that have updates applied in excess of the FIX LIMIT variables.

```
COMPATIBLE PROC
    OPEN THE UPDATE DIRECTORY FILE
    DO WHILE NOT END OF FILE AND NOT AN ERROR
        READ A RECORD FROM UPDATE DIRECTORY
            FILE GETTING THE GROUP_ID,
            FIX_NUMBER, AND ITS
            BASE_NUMBER
        CALL HIGH_BASE TO SET HIGH BASE FOR
            CODE GROUPING FROM THE
            RECORD.
    ENDDO
    CLOSE UPDATE DIRECTORY FILE.
    IF ERROR FROM CLOSING FILE IS GREATER THAN
        THE OS_ERROR_CODE THEN
        OS_ERROR_CODE = CLOSING FILE
            ERROR VALUE
    ENDIF
    IF OS_ERROR_CODE IS GOOD THEN
        CALL LOW_BASE TO SELECT THE LOWEST
            BASE FIX FOR THE BASE LIMIT.
        CALL FIX_LIMITS TO DETERMINE THE FIX
            LIMIT FOR EACH CODE GROUPING
            CONSTRAINED BY THE LOWEST
            COMMON BASE LIMIT.
    ENDIF
ENDPROC COMPATIBLE
```

The subroutine COMPATIBLE opens the update directory file and reads the following variables GROUP_ID, FIX_NUMBER, and BASE_NUMBER associated with records stored therein. The variable BASE_NUMBER is the prerequisite update that must be applied to a common base component of the installed software program prior to the application of the update identified by the variable FIX_NUMBER to its component or feature in order to have a compatible system. The variable BASE_NUMBER contains the value of the update which is the lowest base update that must be applied. Higher updates may be acceptable without conflict.

```
HIGH_BASE PROC
    IF FIX_NUMBER = GROUP_FIX - LIMIT, THEN
        GROUP_BASE = BASE_NUMBER
    ENDIF
    IF FIX_NUMBER = GROUP_FIX_LIMIT + 1, THEN
        IF BASE_NUMBER > GROUP_BASE, THEN
            GROUP_BASE = BASE_NUMBER - 1
        ENDIF
    ENDIF
ENDPROC HIGH_BASE
```

After each of the records is read by the subroutine COMPATIBLE, a subroutine HIGH_BASE is called to determine the highest possible update number for updates applied against the common base component. If the value of the variable FIX_NUMBER from the record does not match the value associated with a variable GROUP_FIX_LIMIT or the value of one plus the value associated with GROUP_FIX_LIMIT, then no action is taken and execution is returned to the subroutine COMPATIBLE. The variable GROUP_FIX_LIMIT contains the value of the fix limit for a particular code grouping. If the value of the variable FIX_NUMBER from a selected record is equal to the value associated with the variable GROUP_FIX_LIMIT, then a variable GROUP_BASE is set equal to the variable BASE_NUMBER in the selected record. The variable GROUP_BASE now contains the minimum update number of the base component to be compatible with the selected code grouping. If the user has not reduced the value associated with the variable GROUP_FIX_LIMIT displayed on the screen panel, then the variable GROUP_BASE will also contain the highest possible update number for the base component. However, if updates for the given code grouping exist beyond the value associated with the variable GROUP_FIX_LIMIT, then the subroutine COMPATIBLE will call HIGH_BASE again. The update that is one higher than the limit will contain a prerequisite base update number that cannot be exceeded for a compatible system. If the GROUP_FIX_LIMIT+1 update has the same BASE_NUMBER as the GROUP_FIX_LIMIT update, then the value of the variable GROUP_BASE remains equal to the value associated with the variable BASE_NUMBER. If however, the GROUP_FIX_LIMIT+1 update has a prerequisite BASE_NUMBER higher than the GROUP_FIX_LIMIT update, the value of the variable GROUP_BASE is reduced by a value of one. Thus, a high base number for a selected code grouping will be at least as high as the prerequisite base number for the code grouping's fix limit but less than the prerequisite base number for the code grouping's update one beyond the update limit.

```
LOW_BASE PROC
    DO FOR EACH CODE GROUPING
        IF CODE GROUPING BASE < BASE_FIX_LIMIT,
        THEN
            BASE_FIX_LIMIT = CODE GROUPING BASE
        ENDIF
    ENDDO
ENDPROC LOW_BASE
```

The subroutine COMPATIBLE then closes the update directory file after all of the update records have been read and processed. A subroutine LOW_BASE is then called in order to determine a variable BASE_FIX_LIMIT which is the lowest common base update number that is compatible with all of the code groupings. The subroutine LOW_BASE facilitates the setting of the variable BASE_FIX_LIMIT to the lowest GROUP_BASE from among all of the code groupings.

```
FIX_LIMITS PROC
    MAX_FIX FOR EACH CODE GROUPING = FIX
        LIMIT FOR EACH CODE GROUPING
    OPEN THE UPDATE DIRECTORY FILE
    DO WHILE NOT END OF FILE AND NOT AN ERROR
        READ A RECORD FROM UPDATE DIRECTORY
            FILE GETTING THE GROUP_ID,
            FIX_NUMBER, AND ITS
            BASE_NUMBER.
        IF NOT END OF FILE AND NOT A READ
        ERROR, THEN
            IF BASE_NUMBER IS LESS OR EQUAL TO
                BASE_FIX_LIMIT, THEN
                DO FOR THE CODE GROUPING
                    THAT MATCHES GROUP_ID
                    IF FIX_NUMBER IS LESS OR
                    EQUAL TO MAX_FIX
                        FOR THE CODE
                        GROUPING, THEN
                        FIX LIMIT FOR THE CODE
                            GROUPING =
                            FIX_NUMBER
                    ENDIF
                ENDDO
            ENDIF
        ENDIF
    ENDDO
    CLOSE THE UPDATE DIRECTORY FILE.
    IF ERROR FROM CLOSING FILE IS GREATER THAN
        THE ERROR FROM READING THE FILE,
        THEN
            OS_ERROR_CODE = CLOSING FILE ERROR
            VALUE
    ENDIF
ENDPROC FIX_LIMITS
```

Finally, subroutine COMPATIBLE calls a subroutine FIX_LIMITS to determine the fix limit for each code grouping constrained by this lowest common base limit, BASE_FIX_LIMIT. The subroutine FIX_LIMITS initializes a set of temporary MAX_FIX variables for each code grouping that contain the fix limits up to this point. The subroutine FIX_LIMITS then opens the update directory file and reads every record before finally closing the file. While it is reading the file, the subroutine FIX_LIMITS updates the fix limit for each code grouping. Thereafter, every record is read and tested to determine whether the value of the variable BASE_NUMBER is less than or equal to the value associated with the variable BASE_FIX_LIMIT. If the value of BASE_NUMBER is less than or equal to the value of BASE_FIX_LIMIT, then the corresponding code grouping is tested to determine whether the FIX_NUMBER from the record is less than or equal to its temporary MAX_FIX variable. This insures that the new limit does not exceed the limit imposed by the user earlier through the display panel. The new FIX LIMIT for the code grouping is set equal to the FIX_NUMBER from the record. By the time all the records of the file have been thus processed, the FIX LIMIT for each of the code groupings will contain the number of the highest update that can be applied while being compatible with the common, prerequisite base update and not exceeding the limits imposed by the user. The subroutine FIX_LIMITS then concludes by closing the file and returning to the subroutine COMPATIBLE which returns to the main program.

```
UNFIX PROC
    DO FOR EACH CODE GROUPING THAT IS
    INSTALLED
        CALL REINSTALL TO REMOVE THE CODE
            GROUPING'S FIXES.
        IF THE CODE GROUPING WAS REINSTALLED,
        THEN
            SET CODE GROUPING'S DELETE FLAG
            ON.
            SET CODE GROUPING'S INSTALL FLAG
            ON.
        ENDIF
    ENDDO
ENDPROC UNFIX
REINSTALL PROC
    CLEAR THE REINSTALL_FLAG.
    INITIALIZE OS_ERROR_CODE TO ZERO.
    IF GROUP_APLD_FIX > GROUP_FIX_LIMIT,
    THEN
        CALL NAME_LISTER TO INITIALIZE FOR
        GROUP_ID.
        IF NO ERROR FROM NAME_LISTER, THEN
            DO UNTIL NAME_LISTER RETURN CODE
                IS EMPTY OR OS_ERROR IS
                ENCOUNTERED.
                CALL NAME_LISTER FOR NEXT FILE
                OF GROUP_ID.
                IF NAME_LISTER RETURN CODE
                IS GOOD, THEN
                    INVOKE OS TO DELETE THE
                    RETURNED FILE.
                    IF NO ERROR FROM DELETION,
                        THEN REINSTALL DELETED
                        FILE.
                    ENDIF
                ELSE - NAME_LISTER RETURN
                CODE_IS EMPTY
                    SET GROUP_APLD_FIX BACK
                    TO ZERO.
                    SET THE REINSTALL FLAG.
                ENDIF
            ENDDO
        ENDIF
    ENDIF
ENDPROC REINSTALL
NAME_LISTER PROC
```

```
IF OPERATION_CODE IS INITITALIZE THEN
   PREPARE MEMORY BUFFER WITH FILE
      NAMES COMPRISING THE SELECTED
      CODE GROUPINGS.
   SET POINTER TO FIRST FILE NAME IN
      MEMORY BUFFER.
   SET RETURN_CODE TO GOOD.
ELSE _OPERATION _CODE IS GET_NAME
   IF MEMORY BUFFER IS EMPTY THEN
      SET RETURN_CODE TO EMPTY.
   ELSE _AT LEAST ONE NAME IS LEFT IN
      THE BUFFER
      MOVE FILE NAME AT POINTER INTO FILE
         NAME PARAMETER.
      DECREMENT POINTER TO POINT TO NEXT
         FILE NAME IN BUFFER.
      SET RETURN_CODE TO GOOD.
      DECREMENT POINTER TO POINT TO NEXT
         FILE NAME IN BUFFER.
      SET RETURN_CODE TO GOOD.
   ENDIF
ENDIF
ENDPROC NAME_LISTER
```

The main program then calls a subroutine UNFIX to remove all updates from the code groupings that are already applied above the fix limits. The subroutine UNFIX then checks an installation flag from a status file associated with each of the code groupings to determine whether its associated component is installed on system 10. If the code grouping is installed, a subroutine REINSTALL is called to reinstall that code grouping without any updates if it contains updates that are beyond the FIX LIMIT. The subroutine REINSTALL then tests for updates exceeding the fix limit by comparing the value associated with a variable GROUP_APLD_FIX, which represents the highest applied update, to the value associated with the variable GROUP_FIX_LIMIT. The variable GROUP_APLD_FIX is stored in the status file which is updated and saved each time an update is applied. If GROUP_FIX_LIMIT is greater than or equal to GROUP_APLD_FIX, then no further action is taken and control is returned to the subroutine COMPATIBLE. Otherwise, when GROUP_APLD_FIX exceeds GROUP_FIX_LIMIT, more updates have been applied to the component than the user desires. So this component must be deleted and reinstalled without any updates.

In order for the subroutine REINSTALL to delete an installed component, a subroutine NAME_LISTER is called to initialize a file name list with names of the files of the particular code grouping that is to be removed. The main loop of REINSTALL calls the subroutine NAME_LISTER to get the next file name in the set. The subroutine NAME_LISTER determines whether a memory buffer is empty, returns the next file name and increments a pointer to the next entry in the buffer. If the memory buffer is empty, the RETURN_CODE is set to EMPTY. Otherwise, the operating system is then invoked to delete the file by that name. This loop continues for every file in the component. The last call to the subroutine NAME_LISTER results in a return code of EMPTY. Since all of the component's files are removed, the GROUP_APLD_FIX is set back to zero to indicate that no updates for this component are applied. A REINSTALL FLAG is set and subroutine REINSTALL returns to subroutine UNFIX. Thereafter, the subroutine UNFIX sets flags for a report showing that the component was deleted and to be installed again this session. After all the code groupings have been considered by the subroutine UNFIX, control is returned to the main program.

At this point in the main program, all of the installed components of the software program have either all of their updates applied or they need to have some applied. None of the components will have updates applied that exceed those of the imposed fix limits. Subroutine APPLY_FIXES is called to apply the unapplied updates to all of the installed components.

```
APPLY_FIXES PROC
   OPEN THE UPDATE DIRECTORY FILE
   DO WHILE NOT END OF FILE AND NOT AN ERROR
      READ AN UPDATE DIRECTORY TITLE RECORD
         GETTING THE GROUP_ID &
         FIX_NUMBER
      DO FOR EACH CODE GROUPING
         CALL FIX_OR SKIP PASSING IT
            FIX_NUMBER FROM RECORD AND
            APPLIED_FIX_NUM FOR CODE
            GROUPING.
      ENDDO
   ENDDO
   CLOSE UPDATE DIRECTORY FILE.
   IF ERROR FROM CLOSING FILE IS GREATER THAN
      THE OS ERROR CODE THEN
      OS_ERROR_CODE = CLOSING FILE
      ERROR VALUE
   ENDIF
ENDPROC APPLY_FIXES
FIX_OR_SKIP PROC
   IF FIX NOT APPLIED
   ((FIX_LIMIT >= FIX_NUMBER) AND
         (FIX_NUMBER > APPLIED_FIX_NUM),
         THEN
      DO UNTIL LAST RECORD OF FIX OR AN
      OS ERROR
         READ NEXT UPDATE DIRECTORY FILE
         TAIL RECORD.
         IF NO READ ERROR, THEN
            IF FIX IS A PATCH TYPE, THEN
               INVOKE OS PATCH FACILITY TO
               APPLY PATCH FROM
                  INSTRUCTIONS IN FILE
                  SPECIFIED IN FXFLSORC
                  OF THE TAIL RECORD.
            ELSE - FIX IS A FILE REPLACEMENT
               REPLACE THE FILE SPECIFIED IN
                  FXFLDEST WITH THE FILE
                  SPECIFIED IN FXFLSORC OF
                  THE TAIL RECORD.
            ENDIF
         ENDIF
      ENDDO
      IF NO ERROR, THEN
         APPLIED_FIX_NUM = FIX_NUMBER
            (UPDATE THE APPLIED FIX
            STATUS)
      ENDIF
   ELSE - THROW AWAY UPDATE DIRECTORY TAIL
      RECORDS OF UPDATE NOT BEING
      APPLIED
      DO UNTIL LAST TAIL RECORD OF UPDATE
         READ OR THERE IS A FILE READ ERROR
         READ AN UPDATE DIRECTORY TAIL
         RECORD.
      ENDDO
   ENDIF
ENDPROC FIX_OR_SKIP
```

Subroutine APPLY_FIXES opens the update directory file and enters a loop reading update title records and calling a subroutine FIX_OR_SKIP to either apply the update or discard the remaining tail records of that update. The subroutine FIX_OR_SKIP performs a test to determine whether the update has been applied. This means that the FIX_NUMBER from the record is greater than the APPLIED_FIX_NUM in the status file for the code grouping but less than the FIX LIMIT. If the update record indicates that the update is a patch such that instructions will be used to modify a file of the component, then a patch facility which is an integral part of the operating system is invoked to apply the patch. Otherwise, the update is a replacement of an entire file which is copied over the previous file by that name.

If the update has already been applied or exceeds the limit, then, tail records are read from the update directory file until the title record of the next update is encountered. Then the subroutine FIX_OR_SKIP returns control to the subroutine APPLY_FIXES. After the subroutine APPLY_FIXES has read and processed all of the records in the update directory file, all of the updates up to the selected limits have been applied. The file is closed and subroutine APPLY_FIXES returns control to the main program which returns control to the driver program with the FINISH value in RETURN_CODE to indicate that all of its work has been accomplished.

Figure 2:
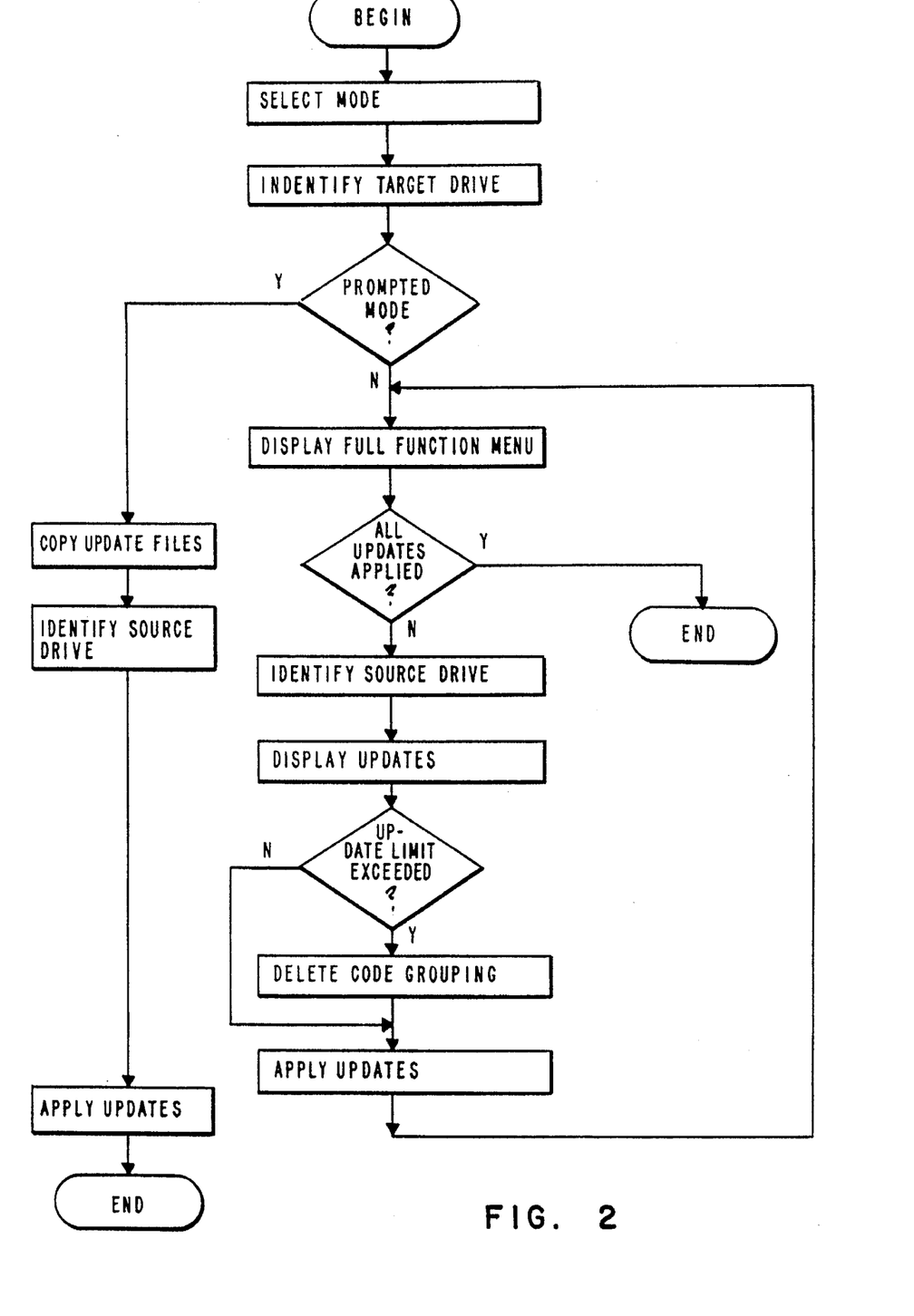
FIG. 2 is a flow diagram illustrating the detailed steps of the method of the present invention.

Referring to FIG. 2, there is shown a flow diagram which illustrates user and system 10 operations for updating the installed software program. In step 30, the user selects one of the modes of operation. As noted above, system 10 operates in the prompted mode or in the full function mode. The user in step 32 identifies a disk drive where the software program, which is to be updated, is stored. System 10 then determines in step 34 whether the user selected the prompted mode of operation in step 30. If the user has selected the prompted mode, the user instructs the system 10 in step 36 to copy the update files thereto. In step 38, the user identifies a source drive where the update files are stored. It should be noted that the update file may be located on a remote server (not shown) which the system 10 communicates with through the modem 28 or through a direct communication link. System 10 then copies the update files on the source drive to the target directory and creates the update directory file on the target directory. Thereafter, system 10 in step 40 determines which of the plurality of features of the software program have been installed on the system and then applies the respective updates to those features.

If the user has selected the full function mode in step 30, system 10 in step 42 displays a full function menu which sets a plurality of functions which can be performed by the update program. System 10 then prompts the user in step 43 to determine if all of the updates have been applied. If there are additional updates to be applied, the user then instructs the system 10 by selecting an apply update function and the system prompts the user in step 44 to identify the source drive. System 10 then copies the update files on the source drive to the target drive and creates the update directory file on the target directory. Thereafter, system 10 in step 46 displays a screen panel which sets forth the highest update number or update limit appearing in the update directory file for each of the features of the software program. The highest number update and all of the lower number updates will be applied to the respective features when the user depresses an enter key on the keyboard 22. Alternately, the user may change the update limit to a lower number. System 10 in step 48 determines whether any previously installed updates exceed the changed update limit. If the update limit has been exceeded, system 10 in step 50 deletes all of the updates applied to those particular features. Thereafter, system 10, in step 52, reapplies the updates up to and including the update associated with the changed update limit. If the previously applied updates did not exceed the changed update limit, system 10 applies all unapplied updates in step 52. System 10 then returns to step 42 wherein the full function menu is displayed again. If all of the updates have been applied, the user, in step 43, terminates the update program. Otherwise, system 10 repeats steps 44 through 52 in the manner noted above.

Figure 3:
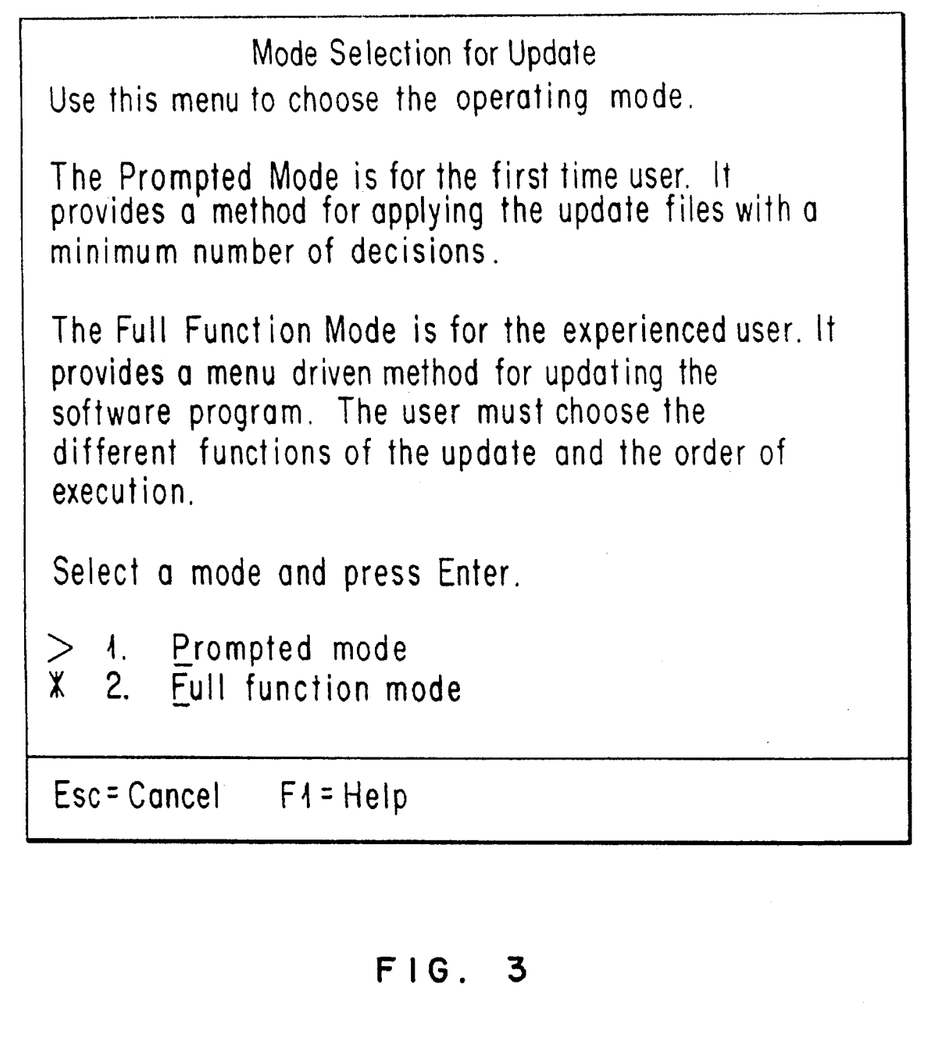
FIGS. 3 through 8 are display screens which are employed by the users of the computer system in updating software installed on the computer system.

Referring to FIG. 3, there is shown a screen panel which is displayed to the user in response to the user indicating to the system 10 that a selected software program is to be updated. It is assumed that some or all of the plurality of features or components of the selected software program have been installed on system 10 and that the user has invoked the update program set forth above to facilitate the updating of the selected software program. The user then selects one of the modes of operation by (1) moving a cursor using a plurality of cursors keys on the keyboard 22 or using a mouse device so that the cursor is positioned adjacent to the mode which is to be selected, (2) pressing a "P" key or a "F" key and pressing the enter key on the keyboard to select the prompted mode or the full function mode, respectively, or (3) pressing the respective numerical key associated with the respective modes shown in the screen panel. System 10 then prompts the user to identify the target drive with a screen panel shown in FIG. 4. Prior to the display of the screen panel shown in FIG. 4, system 10 determines the location where the software program is stored therein and then displays on the screen panel a suggested target drive and directory for the software program. The user may accept the suggested target drive and directory or enter a different target drive or directory.

Figure 5:
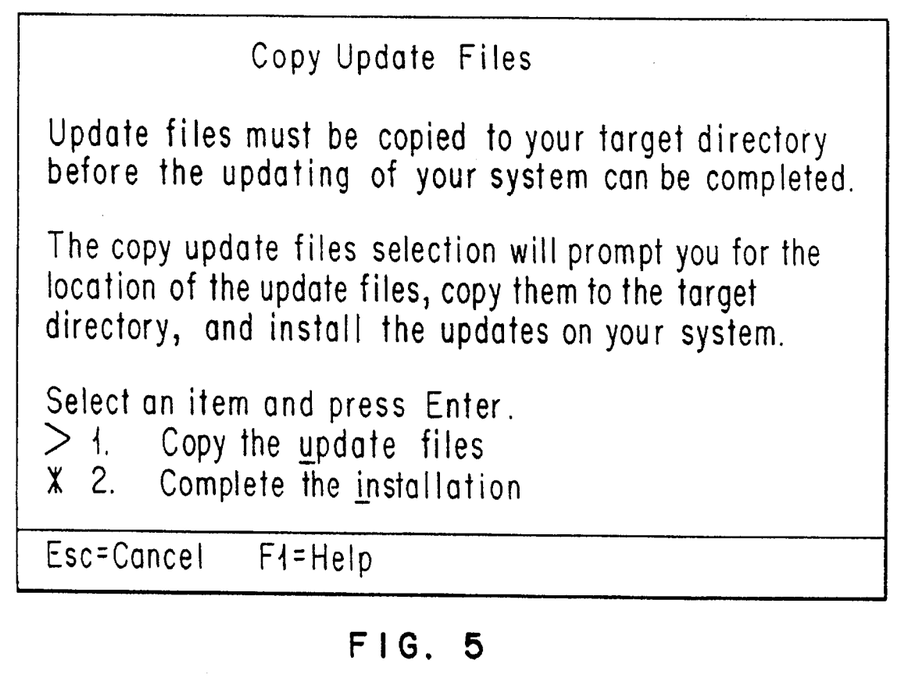
Figure 6:
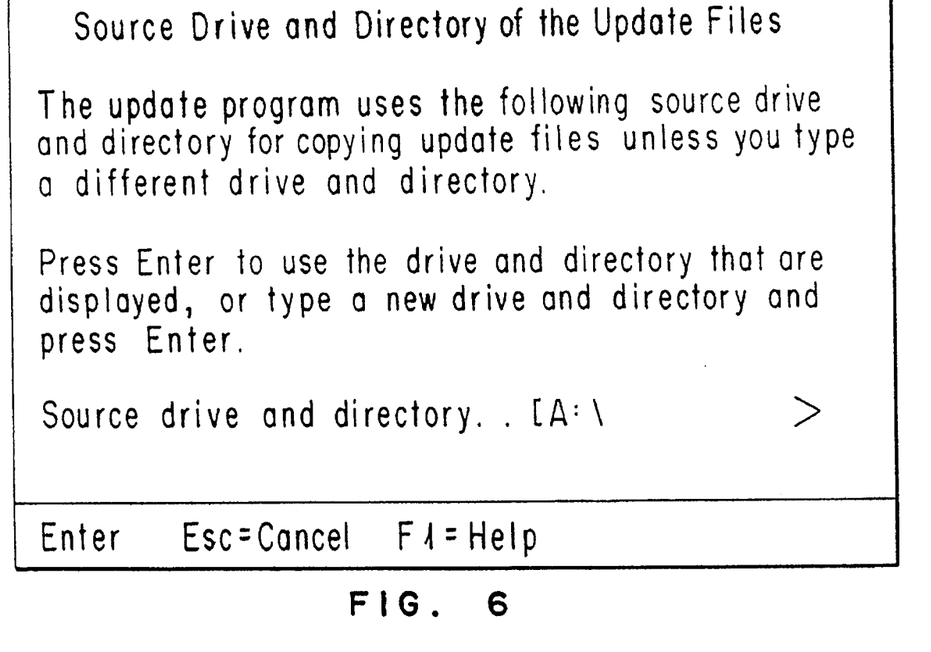

If system 10 is operating in the prompted mode, the system then displays a screen panel shown in FIG. 5. The user enables system 10 to copy the update files by selecting a "copy update files" function as set forth in FIG. 5. System 10 then responds to the selection of the copy function with a screen panel shown in FIG. 6 wherein the user must provide the source drive and directory for the update files. The source drive and directory sets forth the location where the update files are stored. In a manner which is similar to that noted above, system 10 will suggest a source drive and directory which the user may accept or enter a different source drive or directory. The user, by pressing the enter key, enables system 10 to create the update directory file on the target drive and directory and store the update files in the directory. System 10 re-displays the screen panel shown in FIG. 5 wherein the user selects (1) the copy function if there are additional updates to be copied from a different drive and directory or (2) a "complete the installation" function. Once all of the updates have been copied to the target drive and directory, system 10 then determines which of the features of the software program has been installed and applies all of the updates stored in the update directory file to the respective features when the complete the installation function has been selected. After the system has applied all of the updates stored in the update directory file to the respective installed features, the system terminates this mode of operation.

Figure 4:
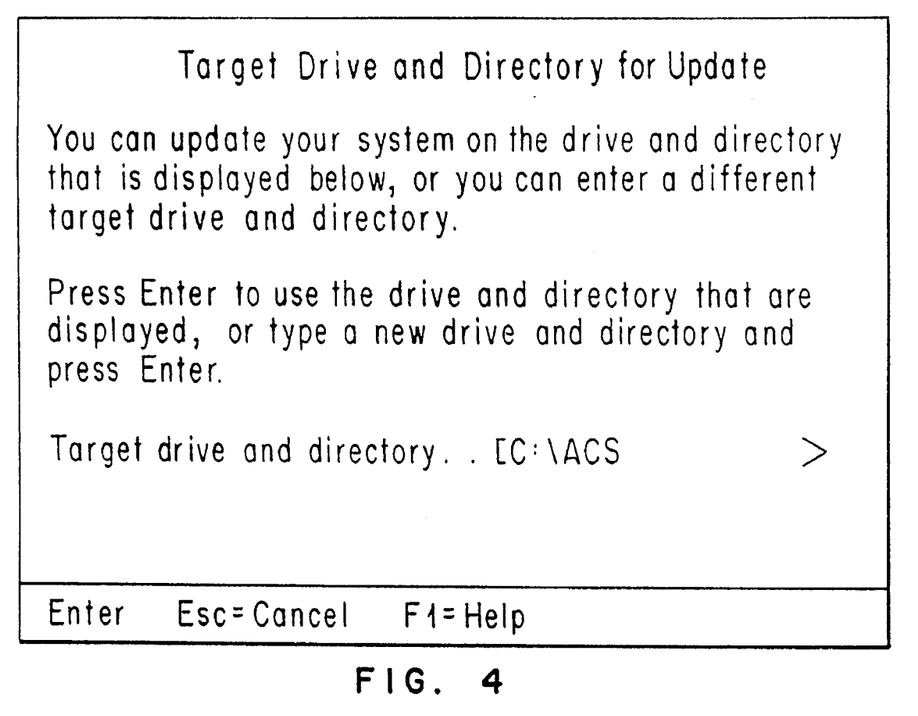
Figure 7:
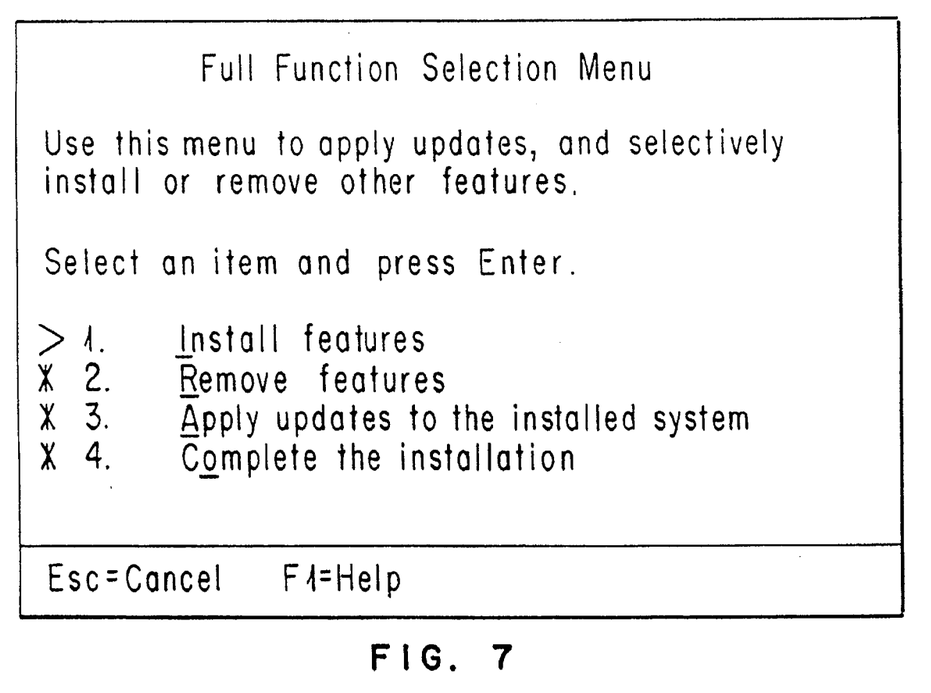
Figure 8:
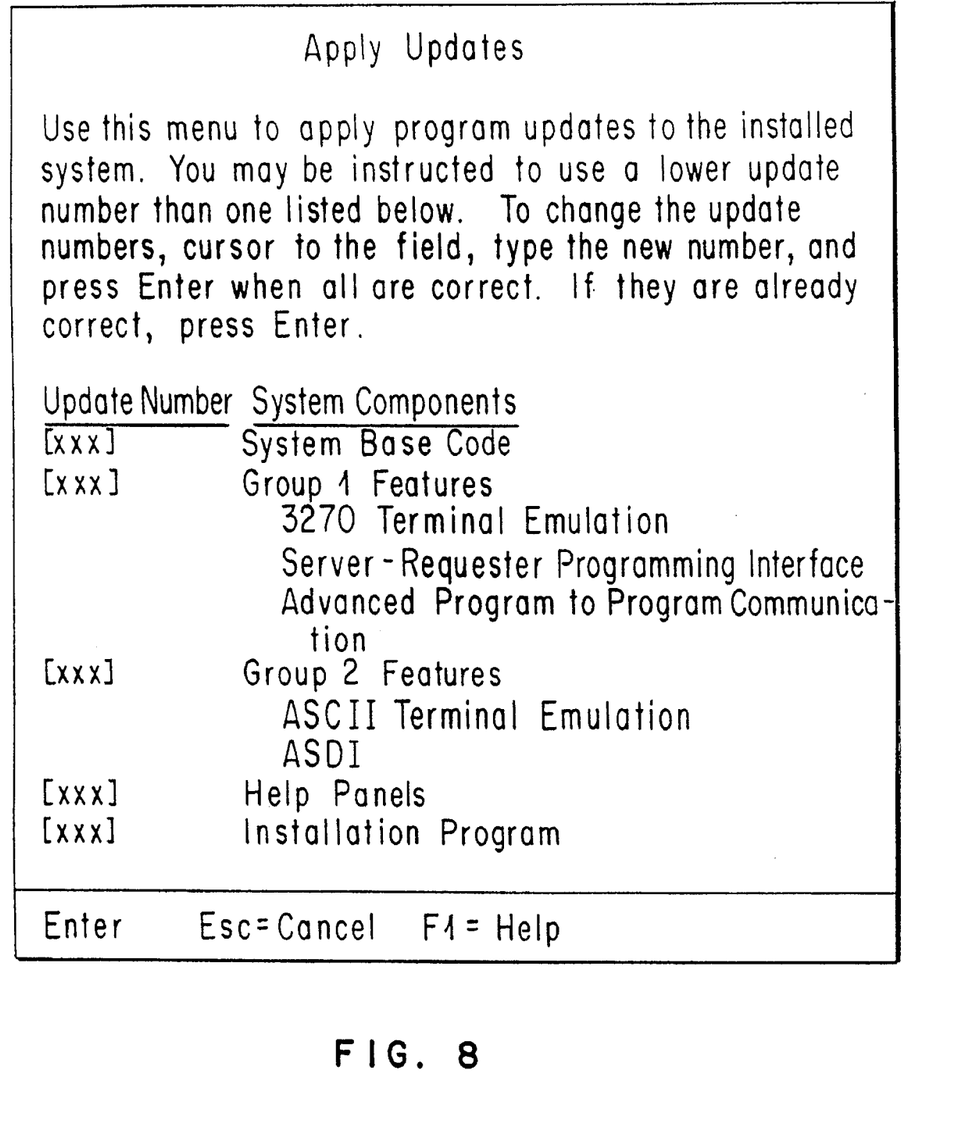

If system 10 is operating in the full function mode, a screen panel, full function selection menu, shown in FIG. 7 is displayed to the user after the display of the screen panel shown in FIG. 4. The user instructs system 10 to apply updates by selecting the appropriate function shown in FIG. 7. System 10 responds by displaying the screen panel shown in FIG. 6 wherein the user must provide the source drive and directory associated with the update files. In a similar manner as noted above, the user may accept the suggested drive and directory or enter a different source drive or directory. System 10 then responds to the input of the source drive and directory by displaying a screen panel shown in FIG. 8. The screen panel shown in FIG. 8 displays the highest update number or update limit in the update directory file for each of the features of the software program installed on the system. These updates and all of the lower updates will be applied to the associated features when the user presses the enter key. Alternately, the user may change the update limit to a lower number. System 10 will then determine if any updates which were previously applied exceed the changed update limit for the respective feature. If the previously applied updates exceed the changed update limit, system 10 will delete all of the updates and reapply all of the updates which are below or equal to the update limit. This activity enables the user to remove or backout any updates previously applied which may cause an error condition to exist in the software program. Thereafter, system 10 will display the screen panels shown in FIGS. 7, 6 and 8 until all of the updates have been applied or removed therefrom.

While the invention has been particularly shown and described with reference to a preferred embodiment, it will be understood by those skilled in the art that various changes in form and detail may be made without departing from the spirit and scope of the invention.

We claim:

1. In a computer system having a display screen and a memory system, a method of updating a software program having at least one of a plurality of features associated therewith installed on said computer system, said method comprising the steps of:

storing information which identifies a plurality of update files in the memory of said computer, said plurality of update files including updates to features installed in said system;

user selecting a mode allowing a user of said system to modify update values associated with said installed features prior to the update of said installed features;

displaying a list of all features of said software program which are installed on said system and update values representing the highest numbered update that can be applied to each of said respective installed features;

displaying identifiers for a first target drive and directory on a display screen of said system to identify where said software program is installed in said system;

displaying identifiers for a first source drive and directory on said display screen to identify where said update files are stored;

displaying identifiers for a second target drive and directory in response to said step of displaying said first target drive and directory when a software program is stored on the second target drive and directory;

displaying identifiers for a second source drive and directory in response to said step of displaying said first source drive and directory when update files are stored on the second source drive and directory; and using the displayed identifiers to selectively update in said computer system those features of said software program determined to be installed on said system, including their related numbered update values, in response to said selected operating mode and said plurality of update files, wherein said at least one of said plurality of features within said software program is updated.

2. The method recited in claim 1, wherein the step of displaying identifiers for a second source drive and directory involves the selection of identifiers for a remote server coupled through a communication link.

3. The method as recited in claim 2 wherein the step of storing comprises the step of storing update files for all of the plurality of features irrespective of the features installed on said system.

4. The method as recited in claim 3, wherein the step of displaying a list further comprises the displaying of a value which represents a highest numbered update stored in the update files and associated with a selected feature.

5. The method as recited in claim 4, further comprises the steps of:

establishing by user selection a value Which represents a maximum update limit for one or more of the features installed on the system, said maximum update limit is less than said highest numbered update;

determining by said computer system whether any updates which were previously applied exceed the maximum update limit for said one or more of the installed features;

deleting from features of the software installed on said system all of the previously applied updates associated with said one or more of the installed features if the maximum update limit of the related features has been exceeded; and updating said one or more features according to said update files up to and including the update associated with maximum update limit.

6. The method as recited in claim 5 wherein a setup date directory file resides on a target drive and directory and further comprises the steps of:

copying update files residing on a source drive and directory to a target drive and directory; and updating said setup date directory file on said target drive and directory in response to said step of copying update files.

* * * * *